United States Patent Office 3,325,417
Patented June 13, 1967

3,325,417
CHEMILUMINESCENT COMPOSITIONS
Michael McKay Rauhut, Norwalk, Conn., assignor to American Cyanamid Company, Stamford, Conn., a corporation of Maine
No Drawing. Filed Oct. 15, 1965, Ser. No. 496,688
14 Claims. (Cl. 252—188.3)

This is a continuation-in-part of U.S. Ser. No. 334,573, filed Dec. 30, 1963, now abandoned.

The present invention relates to novel compositions of matter and reactions for the direct generation of light from chemical energy. The art of generating light from chemical energy, i.e., chemiluminescence, is continually in search of compositions which when reacted substantially improve the intensity and lifetime of light emission. Obviously, improved compositions are constantly in demand for use as signal devices, for area illumination, etc.

The art has known for some time that oxalyl chloride in combination with aqueous (30%) hydrogen peroxide and a fluorescent compound generates a light whose lifetime is very short (on the order of about 30 seconds) and whose intensity is not exceptional. Numerous attempts have been made to improve this chemiluminescent composition, and many others similar to it, but with little success.

Quite surprisingly, however, it has been discovered that far superior results are obtained by combining oxalyl chloride, substantially anhydrous hydrogen peroxide, a fluorescent compound and a diluent, such as an ether. Although the invention lies in the employment of a "minimal" quantity of water, water is a critical reactant; however, the usual, conventionally-employed "anhydrous hydrogen peroxide" contains sufficient water to provide the minimal critical amount of water necessary. For some unexpected reason, the intensity and lifetime of light emission resulting from the combination of these materials are very significantly enhanced, as will be seen hereinafter. Both the initial intensity and the rate of intensity decay with time increase substantially with increasing water concentration. The intensity increase more than compensates for the lifetime decrease so that the quantum yield also increases with increasing water up to a concentration of about $6.15 \times 10^{-2}$ molar.

The term "hydrogen peroxide" as employed herein includes any compound which upon reaction produces hydrogen peroxide.

It has been found that the anhydrous hydrogen peroxide employed may be prepared from aqueous 90% $H_2O_2$ in a conventional manner, or it may be generated in situ from a perhydrate. Typical perhydrates are perhydrate of urea (urea peroxide), perhydrate of pyrophosphate (sodium pyrophosphate peroxide), perhydrate of histidine (histidine peroxide), and the like. Still another form in which the anhydrous $H_2O_2$ may be provided in the composition is that of an anhydrous solution of $H_2O_2$ in a suitable solvent, such as an ether, an ester, an aromatic hydrocarbon, etc., of the type defined hereinafter and referred to hereinabove as a diluent in the composition.

Typical diluents within the purview of the instant discovery are those which do not react readily with hydrogen peroxide or with oxalyl chloride. In addition, the hydrogen peroxide must be at least partially soluble in these diluents, i.e., at least one gram of hydrogen peroxide per liter of diluent. The following are illustrative diluents or solvents: non-cyclic or cyclic ethers, such as diethyl ether, diamyl ether, diphenyl ether, anisole, tetrahydrofuran, dioxane, and the like; esters, such as ethyl acetate, propyl formate, amyl acetate, dimethyl phthalate (the preferred solvent), diethyl phthalate, methyl benzoate, dibutyl phthalate, diiooctyl phthalate, dimethyl adipate, diter-tiary butyl 1,2-naphthalate, and the like; aromatic hydrocarbons, such as benzene, xylene, toluene, and the like. While the inert solvent is not important with regard to the production of light except as a diluent for the necessary reactants, it has been found that some solvents provide superior results. For example, ester solvents such as dimethylphthalate or ethyl acetate give superior light intensities and light yields as compared to those obtained in ethereal solvents such as diethyl ether and tetrahydrofuran. Superior results are also obtained in solvent mixtures containing ester solvents.

The fluorescent compounds contemplated herein are numerous and they may be defined broadly as those which do not readily react on contact with $H_2O_2$; likewise, they do not readily react on contact with oxalyl chloride. Typical suitable fluorescent compounds for use in the present invention are those which have a spectral emission falling between 330 millimicrons and 700 millimicrons and which are at least partially soluble in any of the above diluents. Among these are the conjugated polycyclic aromatic compounds having at least three fused rings, such as: anthracene, substituted anthracene, benzanthracene, phenanthrene, substituted phenanthrene, naphthacene, substituted naphthacene, pentacene, substituted pentacene, perylene, rubrene, and the like. Typical substituents for all of these are phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well known in the art. These are fully described in "Fluorescence and Phosphorescence," by Peter Pringsheim, Interscience Publishers, Inc., New York, N.Y., 1949. While only typical fluorescent compounds are listed hereinabove, the person skilled in the art is fully aware of the fact that the invention is not so restricted and that numerous other fluorescent compounds having similar properties are contemplated herein. Some fluorescent compounds render more preferred results than others. For example, it has been found that fluorescers having emission spectral maxima between 500 m$\mu$ and 630 m$\mu$ provide stronger light intensities in general than fluorescers having spectral maxima outside this range. The fluorescer rubrene, for example, provides far stronger light intensities than the fluorescer 9,10-diphenylanthracene.

It has been found that the molar (moles per liter of diluent) concentrations of the major components of the novel composition hereinabove described may vary considerably. The water concentration may range up to about 4% based on final volume, preferably and critically up to only about 0.8%, based on final volume. The oxalyl chloride (A) concentration is in the range $10^{-3}$ to 4, preferably $10^{-2}$ to 1; the hydrogen peroxide (B) concentration from $10^{-3}$ to 10, preferably $10^{-2}$ to 2; the fluorescent compound (C) from $10^{-5}$ to 5, preferably $10^{-3}$ to $10^{-1}$; and, of course, the diluent (D) provides the remainder. These are final concentrations. Both titration of oxalyl chloride with hydrogen peroxide and the reverse titration indicated a stoichiometry of almost 1:1. However, in most chemiluminescence experiments (see below) where hydrogen peroxide was used in large excess, the stoichiometry is almost certainly closer to 2:1 hydrogen peroxide:oxalyl chloride. However, stoichiometry is not necessarily in a specific direct relationship with optimal chemiluminescence. Moreover, it should be noted that the rate and intensity of reaction as dependent upon water concentration is not an absolute direct relationship as is clear from the fact that there is a maximum water concentration. The hydrogen peroxide concentration is not important so long as a sufficient amount is present to obtain chemiluminescence; however, it has been found that superior light intensities and light yields are obtained as the hydrogen peroxide concentration increases up to about 1 mole per liter.

In preparing the novel chemiluminescent composition of the present invention either the hydrogen peroxide component or the oxalyl chloride component is added last, i.e., subsequent to the fluorescer. For example, oxalyl chloride, or an essentially anhydrous solution of oxalyl chloride in a diluent, may be combined with an essentially anhydrous solution of hydrogen peroxide in a diluent containing a fluorescent compound, such as anthracene. However, where water is added prior to injection (inclusion) of oxalyl chloride, the observed quantum yield is smaller than both (1) the calculated total quantum yield ($Q_W^T$) employing delayed water addition, and (2) the observed quantum yield ($Q_W^T$) corresponding to an equivalent degree of non-aqueous reaction.

Very intense light is generated, pursuant to the present discovery, and light emissions last anywhere from 100 to 2,000 times longer than that of the art-known aqueous composition described hereinbefore.

The following examples are further illustrative, and, as indicated hereinbefore, the invention is by no means limited thereto.

Oxalyl chloride is mixed with ethyl acetate and anthracene. To the resulting mixture a solution of urea peroxide is added and reaction takes place generating light. The final molar concentrations are as follows:

(A) Oxalyl chloride _____ $10^{-2}$
(B) $H_2O_2$ _____ 1
(C) Anthracene _____ $10^{-1}$
(D) Ethyl acetate _____ Remainder Sodium pyrophosphate peroxide in dioxane is prepared. Likewise, phenanthrene is blended with dioxane as a dilutant and this mixture added to the sodium pyrophosphate peroxide-dioxane mixture. To the resulting blend oxalyl chloride is added, intense light being emitted for a significant length of time. The final concentrations are as follows:

(A) Oxalyl chloride _____ 0.5
(B) $H_2O_2$ _____ 3
(C) Phenanthrene _____ 2
(D) Dioxane _____ Remainder A blend of histidine peroxide and benzene is prepared and still another blend of naphthacene and benzene added thereto. To the resulting mixture oxalyl chloride is added. These materials are blended in quantities sufficient to provide final concentrations as follows:

(A) Oxalyl chloride _____ 1
(B) $H_2O_2$ _____ $10^{-1}$
(C) Naphthacene _____ $10^{-4}$
(D) Benzene _____ Remainder Oxalyl chloride in dimethyl phthalate is admixed with benzanthracene in dimethyl phthalate. To this blend is added an anhydrous solution of $H_2O_2$ in dimethyl phthalate. Significant light is emitted, the final concentrations being:

(A) Oxalyl chloride _____ 0.5
(B) $H_2O_2$ _____ 3
(C) Benzanthracene _____ $10^{-2}$
(D) Dimethyl phthalate _____ Remainder This latter reaction is repeated in every essential respect with the exception that pentacene is used in lieu of benzanthracene.

In each of the reactions just described, the non-substituted fluorescent compound may be replaced with any of the substituted fluorescent compounds (phenyl-substituted, alkoxy-substituted, and the like) described hereinbefore, and a very desirable light-generating reaction realized. By the same token, the diluents employed in each of these reactions may be replaced by any one of the diluents specifically set forth hereinabove, or any of the type diluents contemplated herein, and a chemiluminescent composition results.

Essential to the present invention is the fact that anhydrous $H_2O_2$ is present in the reaction mixture, whether it be added to the mixture or prepared in situ from a perhydrate solution.

In each of the following examples, the materials and the experimental procedures employed were as follows.

*Materials*

*Solvents.*—Anhydrous ether (Mallinckrodt Reagent Grade) was further dried by passage through a 30 cm. neutral alumina column, or by distillation over lithium aluminum hydride under argon. Dimethyl phthalate was distilled over lithium aluminum hydride. Residual water was estimated by the Karl Fischer method.

*Oxalyl chloride.*—(Aldrich) was distilled through a 10 x 1 cm. Vigreaux column under argon to obtain a fraction, B.P. 64° (1 atm.) (763 mm.). Standard solutions of oxalyl chloride in ether or dimethyl phthalate ($1.11 \times 10^{-1}$ M to $1.50 \times 10^{-1}$ M) were analyzed gravimetrically by conversion to oxanilimide with excess aniline. This reaction was shown to be quantitative in preliminary large scale experiments.

*Anhydrous hydrogen peroxide* in ether was prepared from 98% hydrogen peroxide dissolved in ether to a concentration of 25%, and dried by shaking 16 hours with excess anhydrous magnesium sulfate. Water estimation of the dried solution by infrared analysis at 1640 cm.$^{-1}$ indicated that residual water was below $2.9 \times 10^{-2}$ M. Standard solutions of hydrogen peroxide (0.758 M to 1.65 M) were prepared from this solution and anhydrous ether and were analyzed iodometrically. Anhydrous hydrogen peroxide solutions in dimethyl phthalate were prepared similarly.

*9,10-diphenylanthracene (DPA)* (Aldrich) was recrystallized from abs. ethanol-chloroform to obtain material, M.P. 250–251°.

*Stoichiometry experiments.*—A magnetically stirred 150 ml. three-necked flask, fitted with a 50 ml. buret and attached to a constant pressure nitrogen manifold, was flushed well with nitrogen and charged with 10.0 ml. (1.020 moles) of 0.012 M hydrogen peroxide in anhydrous diethyl ether and 5 mg. of 9,10-diphenylanthracene (DPA). The buret, also attached to the manifold, was filled with 0.075 M oxalyl chloride solution in anhydrous diethyl ether, and the entire assembly was placed under slight positive nitrogen pressure. Oxalyl chloride was added in 1.0 to 0.5 ml. portions. The chemiluminescence was allowed to decay to zero intensity between additions. The end point was reached when further addition failed to produce light and occurred at 16.0 ml. (1.200 moles) of oxalyl chloride solution. This is a ratio of 1.18 moles oxalyl chloride per mole of hydrogen peroxide. Until very near the end point, each addition of oxalyl chloride solution produced a bright chemiluminescent emission which required in excess of ten minutes to decay. Titration of 0.075 M oxalyl chloride with 0.102 M hydrogen peroxide gave an oxalyl chloride:hydrogen peroxide ratio of 0.94.

*Determinations of light intensities, spectra, and quantum yields*

*Instrumentation.*—A combination spectroradiometer-fluorimeter, designed and calibrated under the direction of Dr. R. C. Hirt, will be described elsewhere in detail. The instrument consisted of a Bausch and Lomb grating monochromator (Model 33–86–25), an Aminco photomultiplier power supply and amplifier and an IP21 photomultiplier tube. The entrance and exit slits of the monochromator were fixed at 1.34 mm. and 0.75 mm. For fluorescence measurements, the instrument was equipped with a General Electric F4T 5/BLB fluorescent tube, mounted to provide frontside excitation of the sample. The amplifier output was fed to a Brown variable speed Electronik recorder or to a Leeds and Northrup integrating recorder for tracking spectral and intensity decay curves. The instrument was used without change for both fluorescence and chemiluminescence measurements. The liquid sample cell was a 10.0 mm. thick 22 mm. diameter cylindrical quartz cuvette of 3.0 ml. capacity. The instrument was calibrated using a National Bureau of Standards tungsten lamp, operated at a color temperature of 2864° K., and the accepted fluorescence yield (0.55) for $1 \times 10^{-3}$ M quinine sulfate in 0.1 N $H_2SO_4$ according to standard procedures. The absolute intensity of exciting light incident on the cuvette was determined by ferrioxalate actinometry; the fraction of incident light absorbed in fluorescence experiments was calculated from the emission spectrum of the exciting light and from absorbence data determined with a Cary Model 14 spectrophotometer.

*Calculation of fluorescence and chemiluminescence quantum yields*

Fluorescence quantum yields were calculated from the formula $$Q_{F1} = \frac{I \text{ emission}}{I \text{ absorbed}} = \frac{aa'\left(\int_\lambda^{\lambda_2} b\lambda I\lambda d\lambda\right)}{I \text{ absorbed}} = \frac{\int_{\lambda_1}^{\lambda_2} C\lambda I\lambda d\lambda}{I \text{ absorbed}}$$

where $I\lambda$ is the observed intensity at wavelength $\lambda$; $b\lambda$ is the wavelength sensitivity calibration factor for $I\lambda$ provided by the standard lamp; $a$ is the reciprocal of the fraction of emitted light reaching the detector and $a'$ is the conversion factor to absolute unts, where $aa'$ is determined by reference to quinine sulfate; $C\lambda$ is the product $aa'b\lambda$. Since the instrument is unchanged for chemiluminescence measurements the factors $C\lambda$ are unchanged, permitting the determination of absolute chemiluminescence quantum yields.

Fluorescence quantum yields in deoxygenated solutions measured with the instrument agreed well with literature values: fluorescein in 0.1 M aqueous $K_2CO_3$, 0.88; eosin in 0.1 N aqueous NaOH, 0.17 rhodamine B in ethanol, 0.92, anthracene in ethanol, 0.25; 9,10-diphenylanthracene in benzene, 0.84.

The chemiluminescence quantum yields in Einstein's mole$^{-1}$ were calculated from the equation:

$$Q.Y. = \frac{\left(\int_0^\infty C\lambda'I\lambda'dT\right)\left(\frac{\int_{\lambda_1}^{\lambda_2} C\lambda I^T\lambda d\lambda}{C\lambda'I^T\lambda'}\right)}{3.0 \times 10^{-3} \text{[oxalyl chloride]} \, 6.02 \times 10^{23}}$$

The first product term in the numerator corresponds to the area of the corrected intensity vs. time decay plot at observed wavelength $\lambda'$, where $I\lambda'$ is the observed intensity and $C\lambda'$ is the instrument calibration factor for $\lambda'$. This term was measured graphically. The second product term in the numerator corresponds to the unit spectral area at time T. The spectral distribution and therefore the unit spectral area did not change appreciably during an experiment so that this was a constant factor for an experiment. This term can be calculated graphically from the area of a plot of $$\frac{C\lambda I^T\lambda}{C\lambda'I^T\lambda'}\text{vs. }\lambda$$

but was actually determined with a Burroughs Datatron 205 Computor, programmed with the calibration data.

*Procedure for chemiluminescence experiments*

The light measurement experienmts were carried out by combining appropriate aliquots of standardized stock solutions of hydrogen peroxide, DPA and water in ether or dimethylphthalate with appropriate aliquots of solvent in a 3.0 ml. magnetically-stirred cylindrical cuvette attached to the radiometer. The stirrer was positioned vertically against the rear, flat side of the cuvette and provided efficient, rapid mixing. The shutter to the radiometer was opened, the recorder was started, and an aliquot of standardized oxalyl chloride was injected from an all-glass syringe. The intensity of emission of a 5 m$\mu$-wide wavelength segment, usually selected at the spectral maximum, was recorded as a function of time from the point of oxalyl chloride injection. Spectral distributions were determined for representative experiments at several times during a single experiment. The time required for spectral scan was short relative to the intensity decay rate, however, the intensities were corrected for intensity decay. The spectral distributions did not change with time during an experiment under the conditions studied. Corrections of the spectra for reabsorption of emitted light was not necessary with DPA concentrations below $1 \times 10^{-3}$ M; at $1 \times 10^{-3}$ M, however, minor reabsorption was noted as a relative loss of intensity at short wavelength. The experiments were not thermostated but were run at room temperature, 25° C., which was constant within one degree. Exotherms were not observed at the low reactant concentrations used in several experiments where the temperature was followed with a thermocouple.

*Effect of oxalyl chloride concentration on quantum yield and reaction rate*

Absolute quantum yields based on starting oxalyl chloride were determined as a function of oxalyl chloride concentration over a forty-fold concentration range in experiments with constant hydrogen peroxide and DPA concentrations in ether solution. The results are summarized in Table I.

TABLE I.—VARIATION OF REACTION RATE AND CHEMILUMINESCENCE QUANTUM YIELD WITH OXALYL CHLORIDE CONCENTRATION IN ETHER [a]

| Oxalyl Chloride Concentration (moles/liter) | Pseudo 1st Order Rate Constant (sec.$^{-1}$) | Chemiluminescence Quantum Yield [b] |
|---|---|---|
| $0.5 \times 10^{-3}$ | [c] $3.48 \times 10^{-2}$ | [c] $0.60 \times 10^{-2}$ |
| $1.0 \times 10^{-3}$ | $3.49 \pm 0.03 \times 10^{-2}$ | $0.51 \pm 0.02 \times 10^{-2}$ |
| $2.0 \times 10^{-3}$ | $3.24 \pm 0.00 \times 10^{-2}$ | $0.49 \pm 0.01 \times 10^{-2}$ |
| $5.0 \times 10^{-3}$ | $3.05 \pm 0.01 \times 10^{-2}$ | $0.49 \pm 0.03 \times 10^{-2}$ |
| $10.0 \times 10^{-3}$ | $2.40 \pm 0.10 \times 10^{-2}$ | $0.42 \pm 0.00 \times 10^{-2}$ |
| $20.0 \times 10^{-3}$ | [d] $1.59 \pm 0.05 \times 10^{-2}$ | $0.59 \pm 0.01 \times 10^{-2}$ |

[a] Experiments with $1.0 \times 10^{-1}$ M $H_2O_2$ and $1.5 \times 10^{-3}$ M DPA at 25° C. Results are the average of two experiments, except where noted.
[b] Based on oxalyl chloride.
[c] Single experiment.
[d] A small "induction period" was noted in the first order luminescence decay plot (see test).

While there is some scatter in the values obtained, it is evident that the quantum yield is essentially constant over the range studied. This result further indicates that oxalyl chloride is essentially consumed prior to the bulk of light emission under these conditions. Since oxalyl chloride is a powerful quencher of DPA emission, the quantum yield would necessarily decrease with increasing oxalyl chloride concentration if oxalyl chloride remained during the emission process. At oxalyl chloride concentrations above $2 \times 10^{-2}$ M, however, an apparent induction period appeared in the emission process, and quantum yields were seriously reduced. These results suggest the presence of oxalyl chloride during the early part of the emission at high oxalyl chloride concentrations.

The experiments in Table I were carried out with a large excess of hydrogen peroxide relative to oxalyl chloride. Under these conditions, only an intermediate derived from oxalyl chloride would be expected to change significantly in concentration during a run, and pseudo first order kinetics should result. This pseudo first order kinetic design permits the first order rate Equation 1 to be used in the form of Equation 2 provided only that the intensity of emission, I, is directly proportional to the concentration of a chemiluminescent intermediate, A, derived from oxalyl chloride. That this latter condition is met under the conditions studied is shown by the constancy of quantum yield with oxalyl chloride concentration.

(1) $$\ln \frac{[A]^\circ}{[A]} = k'T$$

(2) $$\ln \frac{I^\circ}{I} = k'T$$

*The effect of water on quantum yield and reaction rate*

Results from a series of experiments in ether solution where the initial water concentration was varied under otherwise constant conditions are summarized in Table III.

TABLE III.—EFFECT OF WATER ON OXALYL CHLORIDE-HYDROGEN PEROXIDE CHEMILUMINESCENCE IN ETHER SOLUTION [a]

| $[H_2O]$ ($\times 10^2$ Molar) | Initial Intensity (quanta sec.$^{-1}$ ml.$^{-1}\times 10^{-12}$) | $K^1$ (sec.$^{-1}\times 10^2$) | Quantum Yield ($\times 10^4$) |
|---|---|---|---|
| [b] <0.4 | 0.80 | [c] 1.93 [d] (1.13) | 0.41 [d] (0.14) |
| 2.46 | 8.4 | 3.53 | 1.59 |
| 3.69 | 16.6 | 4.75 | 2.33 |
| 4.92 | 29.3 | 6.82 [d] (6.58) | 2.85 [d] (2.65) |
| 6.15 | 46.6 | 9.04 | 3.43 |
| 7.38 | 67.2 | 12.50 | 3.57 |

[a] The reactions were carried out with $2.54\times 10^{-3}$ M oxalyl chloride, $2.13\times 10^{-2}$ M $H_2O_2$ and $2.3\times 10^{-4}$ M DPA, at 25° where the amount of water specified was added prior to injection of oxalyl chloride.
[b] Lower limit of analysis by Karl Fischer method.
[c] Log I vs. T plot was linear only after 30 sec. of reaction. Earlier intensities were below the extrapolated linear plots.
[d] Result from separately prepared "anhydrous ether."

Plots of log $I$ vs. time were, in fact, linear up to at least 90% reaction at oxalyl chloride concentrations of $2\times 10^{-2}$ and below. Data from a typical experiment is summarized in Table II.

Excellent linear log intensity vs. time plots were obtained for all experiments except that at the lowest water concentration where water was not in substantial excess relative to oxalyl chloride.

Results showing the effect of water on reactions in dimethylphthalate solutions are summarized in Table IV.

TABLE IV.—EFFECT OF WATER ON QUANTUM YIELD AND REACTION RATE IN DIMETHYLPHTHALATE SOLUTION [a]

| $[H_2O]$ Moles l$^{-1}$ | Time of Water Addition (sec.) | Time to Reach Maximum Intensity (sec.) | Time to Decay to ½ Intensity (sec.) | Maximum Intensity (quanta sec.$^{-1}$ ml.$^{-1}\times 10^{-14}$) | Quantum Yield Einstein's mole$^{-1}$ |
|---|---|---|---|---|---|
| 0 | --- | 15 | 56 | 8.6 | $4.69\times 10^{-2}$ |
| $0.51\times 10^{-2}$ | 0 | 12 | 45 | 10.1 | $4.64\times 10^{-2}$ |
| $2.54\times 10^{-2}$ | 0 | 10 | 26 | 12.9 | $3.91\times 10^{-2}$ |
| $3.55\times 10^{-2}$ | 0 | 8 | 26 | 14.5 | $3.97\times 10^{-2}$ |
| $3.55\times 10^{-2}$ | 30 | --- | --- | --- | [b] $4.10\times 10^{-2}$ |
| $3.55\times 10^{-2}$ | 60 | --- | --- | --- | [b] $4.47\times 10^{-2}$ |

[a] Reactant concentrations were: Oxalyl chloride, $2.42\times 10^{-3}$ M; $H_2O_2$, 0.15 M; DPA, $1\times 10^{-3}$ M; $H_2O$, $0.67\times 10^{-2}$ M; Temperature, 25° C.
[b] Quantum yields were calculated by multiplying the measured quanta after 30 sec. or 60 sec. by the corresponding ratio obtained from the first experiment (total quanta/quanta after 30 sec.).

TABLE II.—TYPICAL EXPERIMENTAL DATA FOR OXALYL CHLORIDE + HYDROGEN PEROXIDE + DPA REACTION IN ETHER [a]

| Time (sec.) | Intensity [b] (quanta sec.$^{-1}$ ml.$^{-1}\times 10^{-12}$) | $k^1$ (sec.)$^{-1}$ |
|---|---|---|
| [c] (0) | 42.8 | --- |
| 15 | 26.8 | $3.12\times 10^{-2}$ |
| 30 | 17.3 | $3.02\times 10^{-2}$ |
| 45 | 10.8 | $3.06\times 10^{-2}$ |
| 60 | 6.8 | $3.07\times 10^{-2}$ |
| 75 | 4.3 | $3.06\times 10^{-2}$ |
| 90 | 2.8 | $3.03\times 10^{-2}$ |
| 105 | 1.9 | $2.98\times 10^{-2}$ |

[a] Initial concentrations: Oxalyl chloride=$5.0\times 10^{-3}$ M; $H_2O_2=1.0\times 10^{-1}$ M; DPA=$1.5\times 10^{-3}$ M; Temperature=25° C.
[b] Measured at 430 m. and converted to total quanta sec.$^{-1}$ ml.$^{-1}$ by multiplication by instrument calibration and unit spectral area factors.
[c] Extrapolated value.

The pseudo first order rate constants summarized in Table I are seen to decrease moderately with increasing oxalyl chloride concentration. It is shown in the following section that the reaction rate is also dependent on the water concentration. The decreasing rate constants are probably a consequence of water consumption by oxalyl chloride in a minor side reaction.

Again it is seen that the initial intensity and the rate of intensity decay increased with increasing water concentration. Linear pseudo first order plots were not obtained until a substantial excess of water was present. It is clear, however, from the times required to reach one-half intensity, that the reaction is appreciably less rapid in dimethylphthalate than in ether. As indicated in Table VI, added water reduced the time required for the intensity to reach the maximum value. In spite of the increase in maximum intensity with increasing water, the quantum yield decreased somewhat as a consequence of the shorter lifetime. When water addition was delayed 30 sec., the quantum yield of the aqueous portion of the reaction was essentially unchanged from the quantum yield when water was present initially. A 60 sec. delay in water addition, however, increased the quantum yield. It is clear from the results that quantum yields in dimethylphthalate are substantially higher than in ether.

The effect of water on the initial intensity indicates that water is a reactant in a step leading to chemiluminescent emission. The effect of water on the intensity decay rate indicates that water is involved in a rate determining step. In a series of experiments, hydrogen peroxide was varied in experiments where a constant water concentration was introduced 30 seconds following the onset of reaction (Table V).

TABLE V.—EFFECT OF HYDROGEN PEROXIDE ON REACTION RATE AND QUANTUM YIELD IN SYSTEMS CONTAINING WATER [a]

| $(H_2O_2)$ ($\times 10^2$ Molar) | $k^1$ (sec.$^{-1}\times 10^2$) | $Q^F$ ($\times 10^4$) | $Q_W^F$ ($\times 10^4$) | $F_{WT}$ | $Q_W^T$ ($\times 10^4$) | $Q_W^T/Q^T$ |
|---|---|---|---|---|---|---|
| 1.0 | 6.4 | 0.35 | 2.6 | .59 | 4.4 | 5.1 |
| 2.0 | 6.5 | 0.66 | 4.6 | .59 | 7.8 | 5.2 |
| 5.0 | 6.7 | 1.8 | 10.0 | .55 | 18 | 4.2 |
| [b] 5.0 | 7.5 | ------ | ------ | ------ | 6.6 | 1.5 |
| 10.0 | 7.6 | 4.0 | 13.2 | .55 | 24 | 2.8 |

[a] Reactions were carried out with 2.42$\times 10^{-3}$ M oxalyl chloride and 2.0$\times 10^{-4}$ M DPA in ether at 25°. After 30 sec. of reaction, water was injected to provide a water concentration of 3.44$\times 10^{-2}$ M. $Q^F$=The fractional quantum yield observed before water injection; $Q_W^F$= The fractional quantum yield observed after water injection; $F_{WT}$=The fraction of total reaction measured after water injection; $Q_W^T$=The calculated total quantum yield for the reaction in the presence of water; $Q_W^T=Q_W^F/F_W$; $Q^T$=The total quantum yield in the absence of added water.
[b] Water was added *before* oxalyl chloride injection to provide 3.44$\times 10^2$ M water.

This procedure was adopted to minimize direct reaction of water with oxalyl chloride. The marked effect observed from water injection is shown in the figure. As indicated in Table V, the fratcion to total non-aqueous reaction measured in the presence of water ($F_W$) varied from 55% to 59%. Total quantum yield ($Q_W^T$) for the hypothetical system where direct reaction between oxalyl chloride and water is absent was estimated by dividing $Q_W^F$ by $F_W$. It is seen that the hydrogen peroxide concentration has at most a minor effect on the reaction rate.

Also indicated in Table V is the result from an otherwise identical experiment where the water was added prior to injection of oxalyl chloride. The observed quantum yield is not only smaller than the calculated total quantum yield ($Q_W^T$) for the experiment with delayed water addition, it is even smaller than the observed quantum yield ($Q_W^T$) corresponding to only 55% of the total non-aqueous reaction.

*The effect of DPA concentration on quantum yield and reaction rate*

The results of several series of experiments where DPA was varied under conditions where the initial oxalyl chloride, hydrogen peroxide and water concentrations were held constant are summarized in Table VI.

indicates that DPA is not involved in a rate determining step.

*The effect of 2,6-di-t-butyl-4-methylphenol (DTBMP) on quantum yield and reaction rate*

Results of adding the free radical inhibitors DTBMP and styrene to oxalyl chloride-hydrogen peroxide-DPA reactions under a variety of conditions indicate that DTBMP seriously reduces quantum yields in both dimethyl phthalate and ether solutions, but has little effect on reaction rates. The reduction in quantum yield is not a consequence of fluorescence quenching of DPA emission, since the fluorescence quantum yield of 4.6$\times 10^{-4}$ M DPA in deoxygenated ether (0.82) was unchanged by the presence of 1.5$\times 10^{-2}$ M DTBMP. The absence of an appreciable effect on the reaction rate indicates that, unlike ethanol, DTBMP does reduce the quantum yield by competing with water in a rate determining step. Moreover, in contrast to water, delayed addition of DTBMP produced the same decrease in quantum yield as DTBMP present at the reaction start.

Clearly the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

TABLE VI.—VARIATION OF REACTION RATE AND CHEMILUMINESCENCE QUANTUM YIELD WITH HYDROGEN PEROXIDE [$H_2O_2$] AND 9,10-DIPHENYLANTHRACENE (DPA) CONCENTRATIONS IN ETHER SOLUTIONS [a]

| DPA Concentration ($\times 10^4$ Molar) | [$H_2O_2$]=1$\times 10^{-2}$ M [$H_2O$]=~1$\times 10^{-2}$ | | [$H_2O_2$]=2$\times 10^{-2}$ M [$H_2O$]=1.2$\times 10^{-2}$ | | [$H_2O_2$]=5$\times 10^{-2}$ M [$H_2O$]=~1.7$\times 10^{-2}$ | | [$H_2O_2$]=1$\times 10^{-1}$ M [$H_2O$]=~2.7$\times 10^{-2}$ | | [$H_2O_2$]=2$\times 10^{-1}$ M [$H_2O$]=~4.6$\times 10^{-2}$ | |
|---|---|---|---|---|---|---|---|---|---|---|
| | $K^1$ ($\times 10^2$ sec.$^{-1}$)[b] | Q.Y. ($\times 10^3$)[c] | $K^1$ ($\times 10^2$ sec.$^{-1}$)[b] | Q.Y. ($\times 10^3$)[c] | $K^1$ ($\times 10^2$ sec.$^{-1}$)[b] | Q.Y. ($\times 10^3$)[c] | $K^1$ ($\times 10^2$ sec.$^{-1}$)[b] | Q.Y. ($\times 10^3$)[c] | $K^1$ ($\times 10^2$ sec.$^{-1}$)[b] | Q.Y. ($\times 10^3$)[c] |
| 0.33 | 1.88 | 0.018 | 1.78 | 0.041 | 2.09 | 0.135 | 3.07 | 0.260 | 6.13 | 0.53 |
| 0.67 | 1.42 | 0.034 | 1.58 | 0.072 | 2.08 | 0.256 | 3.44 | 0.500 | 7.61 | 1.00 |
| 1.33 | 1.53 | 0.047 | 1.48 | 0.123 | 1.84 | 0.470 | 3.10 | 0.924 | 7.36 | 1.65 |
| 3.30 | 1.82 | 0.163 | 1.78 | 0.389 | 2.10 | 1.09 | 2.97 | 2.26 | 5.97 | 4.17 |
| 5.00 | 1.64 | 0.174 | 1.70 | 0.478 | 1.98 | 1.40 | 3.48 | 3.32 | 7.78 | 6.35 |
| 6.00 | 1.62 | 0.23 | 1.99 | 0.53 | 2.08 | 2.00 | 3.04 | 4.14 | 5.92 | 7.50 |
| 7.68 | 1.43 | 0.37 | 1.55 | 0.88 | 1.98 | 2.38 | 2.79 | 5.27 | 5.47 | 9.81 |
| [d]10.00 | 1.51 | 0.37 | 1.48 | 0.74 | 2.00 | 3.09 | 3.52 | 6.09 | 7.76 | 11.1 |

[a] Reactions were run with 2.35$\times 10^{-3}$ M oxalyl chloride in ether at 25° C.
[b] $K^1$=Pseudo first order rate constant.
[c] Q.Y.=Quantum yield of chemiluminescence based on oxalyl chloride.
[d] DPA self-absorption occurs at this concentration; quantum yields are uncorrected.

It is clear that at each of the five hydrogen peroxide and water concentrations studied, the quantum yield increases with increasing DPA, with the effect becoming smaller at high DPA concentrations. Plots of quantum yield vs. DPA concentration are thus non-linear (except at low concentrations). While there is some scatter in the tabulated pseudo first order rate constants, the absence of any trend with changing DPA concentration

What is claimed is:
1. A composition capable of generating light from chemical energy comprising oxalyl chloride, substantially anhydrous hydrogen peroxide compound, a fluorescent compound and a diluent.
2. The composition of claim 1 wherein the fluorescent compound has a spectral emission falling between about 330 m$\mu$ and about 700 m$\mu$.

3. The composition of claim 1 wherein the solubility of hydrogen peroxide in the diluent comprises at least one gram of hydrogen peroxide per liter of diluent.

4. The composition of claim 1 wherein to generate said hydrogen peroxide in situ, said hydrogen peroxide compound comprises a perhydrate solution.

5. The composition of claim 1, in which said diluent comprises an ester.

6. The composition of claim 1 in which water concentration ranges up to about 4%, based on final volume.

7. The composition of claim 6, in which water concentration ranges up to about 0.8%.

8. A method of generating light from chemical energy which comprises admixing oxalyl chloride, substantially anhydrous hydrogen peroxide, a fluorescent compound and a diluent provided said fluorescent compound is added at least before the addition of the last-added compound of said oxalyl chloride and said anhydrous hydrogen peroxide.

9. The process of claim 8, in which hydrogen peroxide is added to a blend of the remaining components.

10. A process of claim 8, in which oxalyl chloride is added to a blend of the remaining components.

11. A method according to claim 8 in which water is employed in a concentration ranging up to about 4%, based on final total volume.

12. The process of claim 11, in which said water is employed in an amount ranging up to about 0.8%.

13. The process of claim 11, in which said diluent comprises an ester.

14. In process for controlling the rate and intensity of chemiluminescent light production, the improvement comprising adding water in an amount sufficient to obtain a concentration ranging up to about 4% based on final volume, in a substantially anhydrous chemiluminescent composition which comprises oxalyl chloride, a substantially anhydrous hydrogen peroxide, a fluorescer, and a diluent.

References Cited

Chandross: "A New Chemiluminescent System"; Tetrahedron Letters, No. 12, pp. 761–765 (1963).

LEON D. ROSDOL, *Primary Examiner.*

J. D. WELSH, *Assistant Examiner.*